(12) United States Patent
Malmberg et al.

(10) Patent No.: US 8,781,216 B2
(45) Date of Patent: Jul. 15, 2014

(54) METHOD FOR PERFORMING AUTOMATIC CLASSIFICATION OF IMAGE INFORMATION

(75) Inventors: Bo Malmberg, Uppsala (SE); Michael Nielsen, Farsta (SE); Anders Wastfelt, Hagersten (SE)

(73) Assignee: Choros Cognition AB, Hagersten (SE)

( * ) Notice: Subject to any disclaimer, the term of this patent is extended or adjusted under 35 U.S.C. 154(b) by 108 days.

(21) Appl. No.: 13/255,686

(22) PCT Filed: Mar. 9, 2010

(86) PCT No.: PCT/SE2010/050267
§ 371 (c)(1),
(2), (4) Date: Sep. 9, 2011

(87) PCT Pub. No.: WO2010/104462
PCT Pub. Date: Sep. 16, 2010

(65) Prior Publication Data
US 2012/0002865 A1    Jan. 5, 2012

(30) Foreign Application Priority Data

Mar. 10, 2009   (SE) ...................................... 0950140

(51) Int. Cl.
*G06K 9/00*   (2006.01)
(52) U.S. Cl.
USPC .......................................................... 382/154
(58) Field of Classification Search
None
See application file for complete search history.

(56) References Cited

U.S. PATENT DOCUMENTS

| 2003/0125877 A1* | 7/2003 | Hanson ............................. 702/5 |
| 2005/0047663 A1 | 3/2005 | Keenan et al. |

(Continued)

FOREIGN PATENT DOCUMENTS

| WO | 01/33505 A2 | 5/2001 |
| WO | 2008/118977 A1 | 10/2008 |

OTHER PUBLICATIONS

A. Wastfelt. 2009. Land use qualities identified in remotely-sensed images. Int. J. Remote Sens. 30, 9 (Jan. 2009), 2411-2427.*

(Continued)

*Primary Examiner* — Nirav G Patel
(74) *Attorney, Agent, or Firm* — Young & Thompson

(57) ABSTRACT

The method is characterized in that the method comprises the steps that a computer or several interconnected computers are caused to a) store, in the form of a pixel set in which set each pixel is associated with image information in at least one channel for light intensity, a first image to be classified onto a digital storage medium; b) carry out a first classification of the image, which classification is caused to be based upon the image information of each respective pixel and which classification is caused to associate each pixel with a certain class in a first set of classes, and to store these associations in a first database; c) calculate, for each pixel and for several classes in the first set of classes, the smallest distance in the image between the pixel in question and the closest pixel which is associated with the class in question in the database, and to store an association between each pixel and the calculated smallest distance for the pixel in a second database for each class for which a distance has been calculated; d) carry out a second classification of the data in the second database, which classification is caused to be based upon the smallest distance for each pixel to each respective class, and to associate each pixel to a certain class in a second set of classes; and e) store the classified image in the form of a set of pixels onto a digital storage medium, where each pixel comprises data regarding the association of the pixel to the certain class in the second set of classes, and where the classified image has the same dimensions as the first image.

19 Claims, 6 Drawing Sheets

(56) References Cited

U.S. PATENT DOCUMENTS

2008/0201397 A1* 8/2008 Peng et al. .................. 708/308
2009/0301198 A1* 12/2009 Sohn et al. ..................... 73/598

OTHER PUBLICATIONS

Nasser, S.; Alkhaldi, R.; Vert, G.; , "A Modified Fuzzy K-means Clustering using Expectation Maximization," Fuzzy Systems, 2006 IEEE International Conference on , vol., No., pp. 231-235, 0-0 0.*
Mickelson et al., 1998 J.G. Mickelson, D.L. Civco, J.A. Silander, "Delineating forest canopy species in the Northeastern United States using multi-temporal TM imagery," Photogrammetric Engineering and Remote Sensing, 64 (1998), pp. 891-904.*
Sharma et al., "Digital Landuse Classification in Himalayan Region from Remotely Sensed Data," Int. Conf. Auto Carto 1986, Imperial College, London, U.K., Sep. 14-19, 1986.*
Tranh T N et al.: "Clustering multispectral images: a tutorial", Chemometrics and Intelligent Laboratory Systems, May 28, 2005, Elsevier Science Publishers B.V. Amsterdam, NL, vol. 77, No. 1-2, p. 3-17, ISBN, 0169-7439, Section 402, 5.2.2, 5.5, abstract, cited in ISR.
Suliga M et al.: "Markov random field-based clustering applied to the segmentation of masses in digital mammograms", Computerized Medical Imaging and Graphics, Sep. 1, 2008, Pergamon Press, New York, NY, US, vol. 32, No. 6, p. 502-512, ISSN 0895-6111. Section 3.2-3.4, abstract, cited in ISR.
Dulyakarn et al. "Fuzzy C-Means Clustering using spatial information with application to remote sensing", 22nd Asian Conference on Remote Sensing, Nov. 5-9, 2001, Singapore. [Retrieved on Aug. 24, 2009], Retrieved from the Internet <URL:http://www.crisp.nus.edu.sg/acrs2001/pdf/113RANGS.PDF>, Section 1, 3, figures 1-2, abstract, cited in ISR.
El-Dawlatly et al.: "New Spatial FCM Approach with Application to SAR Target Clustering", Jan. 1, 2006, ICSP2006 Proceeding, IEEE, ISBN 978-0-7803-9736-1, ISBN 0-7803-9736-3, Abstract, Cited in ISR.
International Search Report, dated Jun. 24, 2010, from corresponding PCT application.
Malmberg et al., "Reading landscapes--Satellite Images and the Social Sciences", Jan. 2009, XP55039137.
Gurney et al., "The Use of Contextual Information in the Classification of Remotely Sensed Data", Photogrammetric Engineering & Remote Sensing, 1983, vol. 49, No. 1, pp. 55-64, XP55039136.
Haralick, Robert M., "Statistical and Stuctural Approaches to Texture", Proceedings of the IEEE, 1979, vol. 67, No. 5, pp. 786-804, XP001149154.
Aksoy et al., "Scene Modeling and Image Mining With a Visual Grammar", aksoy'visual'grammar, 2002, pp. 1-28, XP55039126.
Mas, J. F., "Mapping land use/cover in a tropical coastal area using satellite sensor data, GIS and artificial neural networks", Estuarine, Coastal and Shelf Science, 2004, vol. 59, pp. 219-230, XP27125169.
Wharton, Stephen W., "A Contextual Classification Method for Recognizing Land Use Patterns in High Resolution Remotely Sensed Data", Pattern Recognition, 1982, vol. 15, No. 4, pp. 317-324, XP55039129.
Gong, et al., "Land-use classification of SPOT HRV data using a cover-frequency method", XP55039131, 1992.
Waestfelt et al., "Identifying Landcover Qualities from Satellite Images", Continuous Landscapes in Finite Space: Making Sense of Satellite Images in Social Science, 2004, pp. 167-183, XP008154140.
Extended European Search Report, dated Sep. 28, 2012, from corresponding EP application.

* cited by examiner

METHOD FOR PERFORMING AUTOMATIC CLASSIFICATION OF IMAGE INFORMATION

The present invention relates to the automatic classification of image information.

BACKGROUND OF THE INVENTION

Various imaging techniques in two or more dimensions are now central within many fields of technology. For example, satellite images are used as originals or in processed form for mapping, in demographic, economic and environmental analyses, as well as within community planning. Three-dimensional images is for instance achieved through various medical imaging techniques, and are used to analyze the human body, as support for surgeons during surgery, and so forth, but also within for example the nanotechnological field. Collected image data is analyzed and used in numerous applications to control the behaviour of robots and other technical equipment, with the aim of navigating through space, selecting and handling objects and interacting with other technology as well as with people. Furthermore, two-dimensional imaging techniques are used within microscopy.

In general, the information contained in such an image requires interpretation before use. The goal of such interpretation is typically to identify the structural components in the image, such as an object against a background; different fields that are delimited one to another or volumes of different colour intensity, structure or which are distinct as compared to each other in other ways; or deviating elements. Examples include identifying roads, housing, forest, farm land, etc. from satellite images; distinguishing faces in a photography depicting human beings; separating various types of tissue in a three-dimensional NMR image of a person; and identification of material deviations based upon a photography of a manufactured detail.

It is often for cost reasons desirable to achieve an automatic interpretation of an image. One way to carry out such interpretation starts out from a digital image in two or more dimensions, built up from a number of individual pixels. Each pixel is then associated with one certain respective class of pixels, selected among a number of such classes designed to represent a certain pixel type. When all pixels have been associated with a respective class, an inventory can be made of each class, so as to obtain a collected picture of where in the image pixels of a certain type occur. Herein, such method is denoted a "classification". Hence, a certain class can for example represent "road", "muscle tissue" or "material defect".

Typically, classification techniques are used to locate objects and borders, such as lines, curves, fields, etc., in an image.

Several attempts have been made to achieve a method for automatically performing various useful classifications of images where the knowledge of the image contents is limited before the start of the classification.

For instance, a method has been proposed in which a movable "window" is swept across the image in an attempt to classify a pixel located in the centre of the window to a certain class identity by studying the centre pixel's surrounding pixels and using statistical methods (kernel-based segmentation). For some types of images, such methods can be efficient, but the result of the classification is often very scattered, with classes comprising pixels from many different parts of the image. The result is that it is difficult to obtain useful information from the classification without large amounts of manual work.

An automatic classification of an image has also been proposed with parallel consideration to all pixels, in an iterative method (window-independent classification). One example of an algorithm which can be used in such method is a cluster analysis of K-means type. Even such methods often result in scattered classifications when used to classify digitally stored images.

In the article "Automated Segmentation of MR Images of Brain Tumors", Kaus, Michael R., et al., Radiology 2001; 218:586-591, an iterative classification of a three-dimensional MR-reproduction of a human skull is disclosed. The classification is performed iteratively, with the help of among other things local segmentation strategies and a distance transform which calculates the distance between a certain voxel (a three-dimensional pixel) and a certain class, and also on the basis of information regarding greyscale intensity of the voxels taking part of the reproduction.

The majority of the steps making up such method must be carried out manually in order to achieve sufficient reliability of the finally classified result. Additionally, a comparatively solid knowledge of the object is required before the classification is started, for example in the form of a comparative image illustrating a "normal case" or the like.

The present invention solves the above described problems.

SUMMARY OF THE INVENTION

Thus, the invention relates to a method for classifying an image, and is characterised in that the method comprises the steps that a computer or several interconnected computers are caused to a) store, in the form of a pixel set in which set each pixel is associated with image information in at least one channel for light intensity, a first image to be classified onto a digital storage medium; b) carry out a first classification of the image, which classification is caused to be based upon the image information of each respective pixel and which classification is caused to associate each pixel with a certain class in a first set of classes, and to store these associations in a first database; c) calculate, for each pixel and for several classes in the first set of classes, the smallest distance in the image between the pixel in question and the closest pixel which is associated with the class in question in the database, and to store an association between each pixel and the calculated smallest distance for the pixel in a second database for each class for which a distance has been calculated; d) carry out a second classification of the data in the second database, which classification is caused to be based upon the smallest distance for each pixel to each respective class, and to associate each pixel to a certain class in a second set of classes; and e) store the classified image in the form of a set of pixels onto a digital storage medium, where each pixel comprises data regarding the association of the pixel to the certain class in the second set of classes, and where the classified image has the same dimensions as the first image.

In the following, the invention will be described in detail, with reference to exemplifying embodiments of the invention and to the appended drawings, where:

DETAILED DESCRIPTION OF THE PREFERRED EMBODIMENTS

Figure 1:
FIG. 1 is a photographic, digital satellite greyscale image of a partly developed area.

FIG. 1 is thus a photographic satellite image with a pixel resolution of 10×10 m over a partly developed geographical area. The expression "photographic image" is hereby used with the meaning that it is brought about by light being captured and interpreted by an image sensor. In other words, the image may be constructed by reading of light in one or several wavelength intervals. The image in FIG. 1 is a so-called composite image, based upon 3 different spectral bands that subsequently have been converted to greyscale in a manner which is conventional as such. The image is stored in digital format on a suitable storage medium in the form of a set of pixels, wherein each pixel is associated with image information in at least one channel for light intensity. In FIG. 1, a two-dimensional image is shown, where the pixels are arranged in a two-dimensional coordinate system, and where each pixel is associated with one single channel for light intensity (grey nuance). However, it is realized that images having more than two dimensions, and with light intensities across more than one cannel (for example light intensity information stored according to the RGB standard), may be used according to the present invention.

It is desirable to achieve an automatic classification of such images, in order to simply and with high precision distinguish different types of features in the image, such as roads, housing, forest, arable land, parks, etc.

Figure 2:
FIG. 2 shows a conventional, kernel-based segmentation over five classes for the satellite image illustrated in FIG. 1.

The image shown in FIG. 2 is the same image as the one in FIG. 1, but where the image has been processed by a conventional, kernel-based segmentation. A window of 5×5 pixels has been swept across the image, and for each pixel the standard deviation has been calculated with respect to light intensity of the pixel in question. These metrics have subsequently provided the basis for a conventional distribution into classes based upon threshold values, resulting in the illustrated classification. The result is illustrated in FIG. 2, in which different classes are illustrated using different shades of grey. It is clear from the figure that such method is successful for finding different classes and in order to, for each pixel, assign to the pixel an association to a specific class. Moreover, many of the pixels constituting different types of terrain, such as for example "road", in the image shown in FIG. 1 are grouped since they are associated with one and the same class. To the contrary, there is comparatively large noise in the classified image. Too many pixels have been associated with some other class than most pixels constituting the same type of ground in the original image. Therefore, it is difficult to for example perform an automatic mapping based upon such classification.

Figure 3:
FIG. 3 shows a conventional, window-independent classification over twenty-nine classes for the satellite image illustrated in FIG. 1.

In a way similar to that of FIG. 2, FIG. 3 illustrates a classification of the image shown in FIG. 1, with the difference that the classification in FIG. 3 is done according to a conventional, window-independent cluster analysis of K-means type over 29 classes. As is clear from FIG. 3, this classification suffers from the same types of problems as that of FIG. 2.

Figure 6:
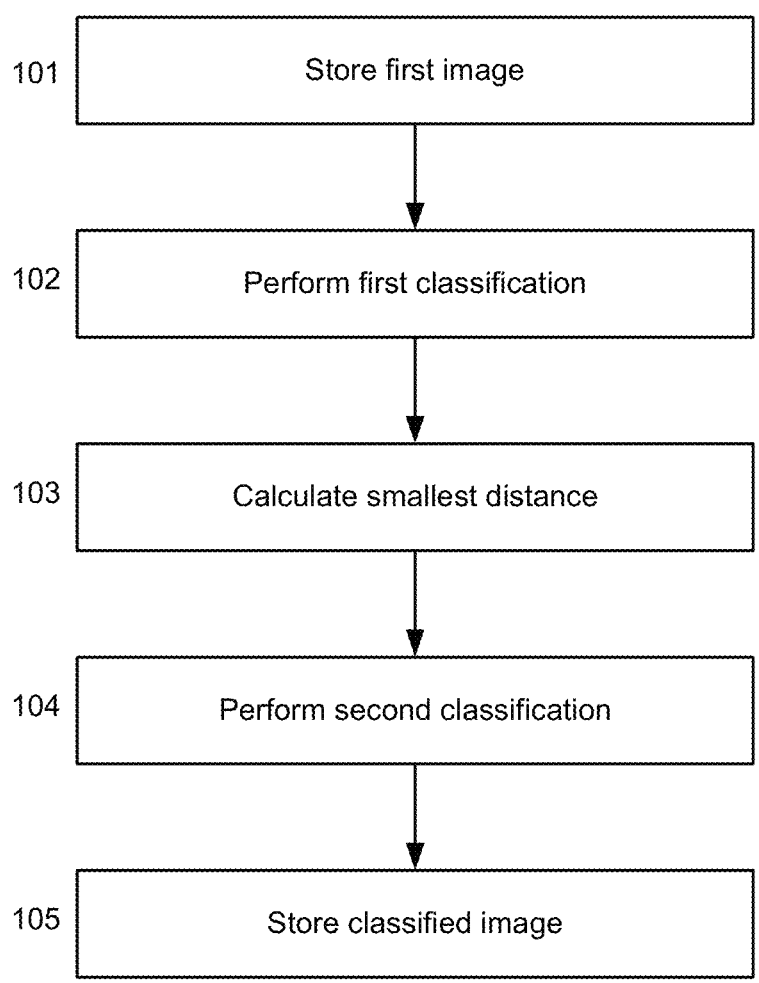
FIG. 6 is a flow diagram illustrating a method according to the present invention.

FIG. 6 shows a flow diagram illustrating a method according to the present invention.

Hence, according to the invention, in a first step 101 a computer, or several interconnected computers, stores the image digitally onto a digital storage medium in the form of a set of pixels, where each pixel is associated with image information in at least one channel for light intensity.

In a second step 102, the computer or computers thereafter carry out a first classification of the digitally stored image, and stores the result from this classification in a first database. In the present exemplifying embodiment, the classification shown in FIG. 3 is stored in the first database. Herein, the result of this classification is denoted "the first classification". The database can be the internal memory of the operating computer, a file on a hard disk or another type of internal or external database. What is important is that an association to a certain specific class in the set of classes (the first set of classes) used in the first classification is stored in the first database for each pixel in the original image.

The first classification may be a cluster analysis of K-means type, or any suitable kernel-based or window-independent classification, as long as the classification is based upon the stored image information for each respective pixel. The first classification may be based upon predefined, static classes, a predefined number of variable classes, or the classes and their definitions may assume their final form during the course of the classification.

The first classification can also be a supervised or unsupervised classification. A supervised classification consists of two steps. In the first step, representative areas are identified in a representative image, and a numerical description of the properties of the representative areas is achieved. In the second step, the numerical descriptions of representative areas are used as classes in a final classification of an image. In an unsupervised classification, each pixel in a certain image is associated to a certain class, where the properties of all classes are determined during the course of the process, that is with no previous knowledge about the types of image areas that may occur. According to the invention, it is preferred to use an unsupervised classification, since it can function over a broader spectrum of different images without specific adaptations.

Examples of useful supervised classifications are "Minimum-Distance-to-Means classifier", "Parallelepiped Classifier", "Gaussian Maximum Likelihood Classifier", "K-nearest neighbour" and "Maximum Likelihood classification".

Examples of useful unsupervised classifications are various hierarchal clustering methods, partitional clustering methods, "K-mean" clustering and "Self organizing maps".

After this initial classification, in a third step 103 according to the invention, the computer or computers calculate for each pixel in the original image the smallest distance, preferably the smallest Euclidian distance, in the image between the pixel in question and the closest pixel which in the first classification has been associated to a certain specific class in the classes used during the course of this first classification. This calculated distance is associated with each respective pixel, and the association is stored in a second database, which may be the same as the first database or a second one. In the latter case, this second database may be of the type described above in connection with the first database.

Such a smallest distance is calculated for each one of the pixels in the original image, and for several of the classes in the first classification.

Figure 4:
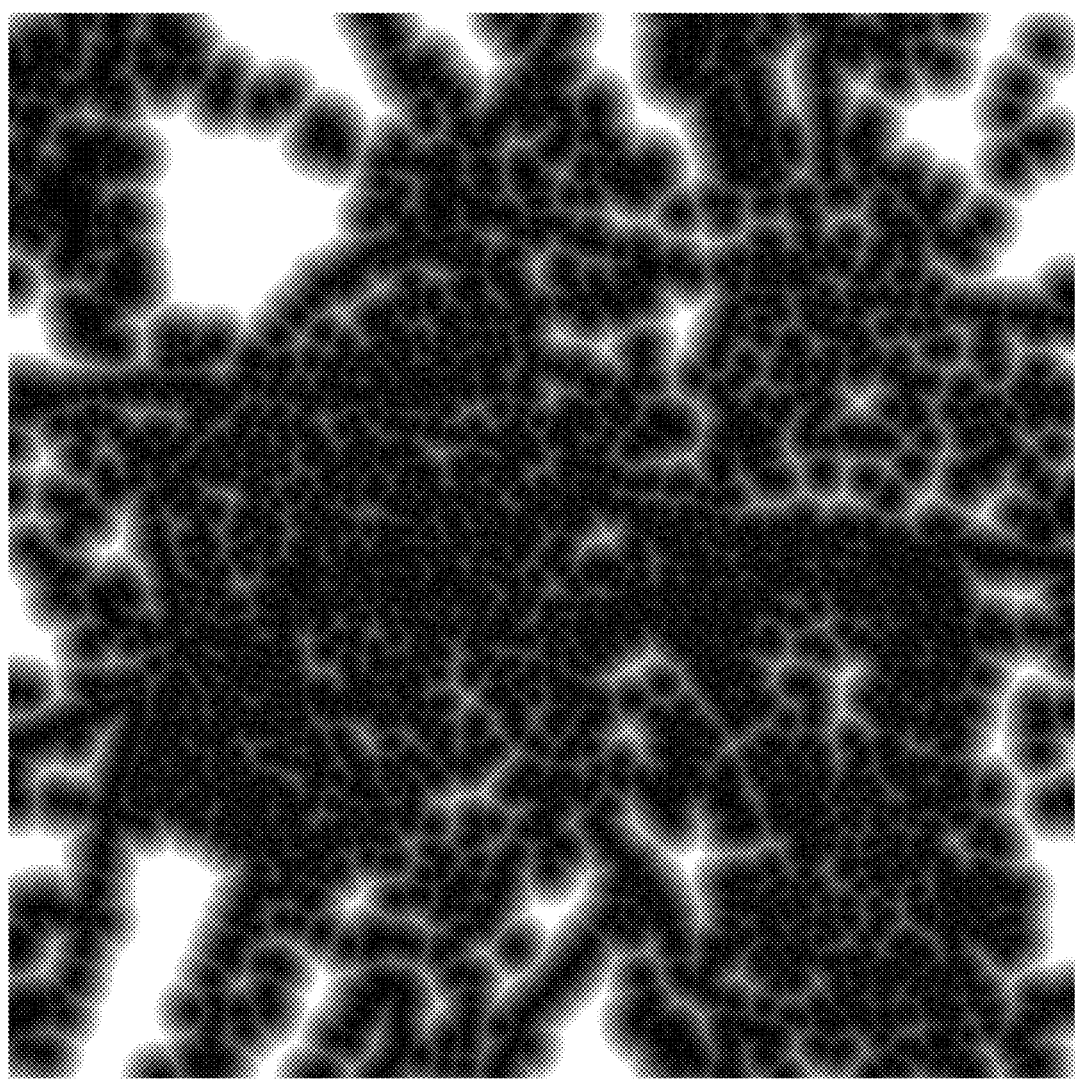
FIG. 4 is a graphical illustration of the distribution of smallest distances from each respective pixel to one of the classes shown in FIG. 3.

FIG. 4 graphically illustrates the calculated smallest distance between each pixel and one of the classes illustrated in FIG. 3. The smallest distance between each respective pixel and the class in question is illustrated using shades of grey— the darker the colour of the pixel, the longer its distance to the closest pixel which has been associated with the class in question.

Thereafter, according to a fourth step 104 according to the invention, the computer or computers perform a second classification, this time based upon the data stored in the second database and preferably for and based upon all pixels in the original image. According to the invention, the relevant metric for this second classification is, for each pixel, the or those calculated smallest distance(s) to classes as calculated in step 103. These calculated smallest distances can thus be one or several measurement values per pixel, why it may be necessary to for example perform a multi-dimensional cluster analyses as a part of the second classification.

Suitable types of classifications for the second classification are those described above as suitable for the first classification, and the second classification may be of the same type as, or another type than, the first classification. However, it is preferred that the second classification is of an unsupervised type. Moreover, it is preferred that the second classification is of an unsupervised type regardless of whether the first classification is of a supervised or unsupervised type. Such method permits automatic and precise classification over a broad spectrum of different original images.

Hence, the outcome of this second classification is an association between each respective pixel in the original image and a certain specific class in a second set of classes which is either predefined or is defined during the course of the second classification.

Thereafter, according to the invention the computer or the interconnected computers stores, in a fifth step 105, this association for each respective pixel onto a digital storage medium, which is the same one as that onto which the original image was stored or a different one, and where the storage technique can be as described above regarding the original image. The important thing is that the set of pixels, each with an association to a certain specific class, is stored in a way which permits this information to be represented as a classified image, in which the position of each pixel in the classified image corresponds to the position of the pixel in the original image, and in which the value of the respective pixel, such as colour intensity in one or several channels, corresponds to the class to which the pixel in question has been associated. As a result, the classified image has the same dimensions regarding the number of pixels as the original image. In subsequent steps, the resolution of the classified image may of course be adjusted.

Figure 5:
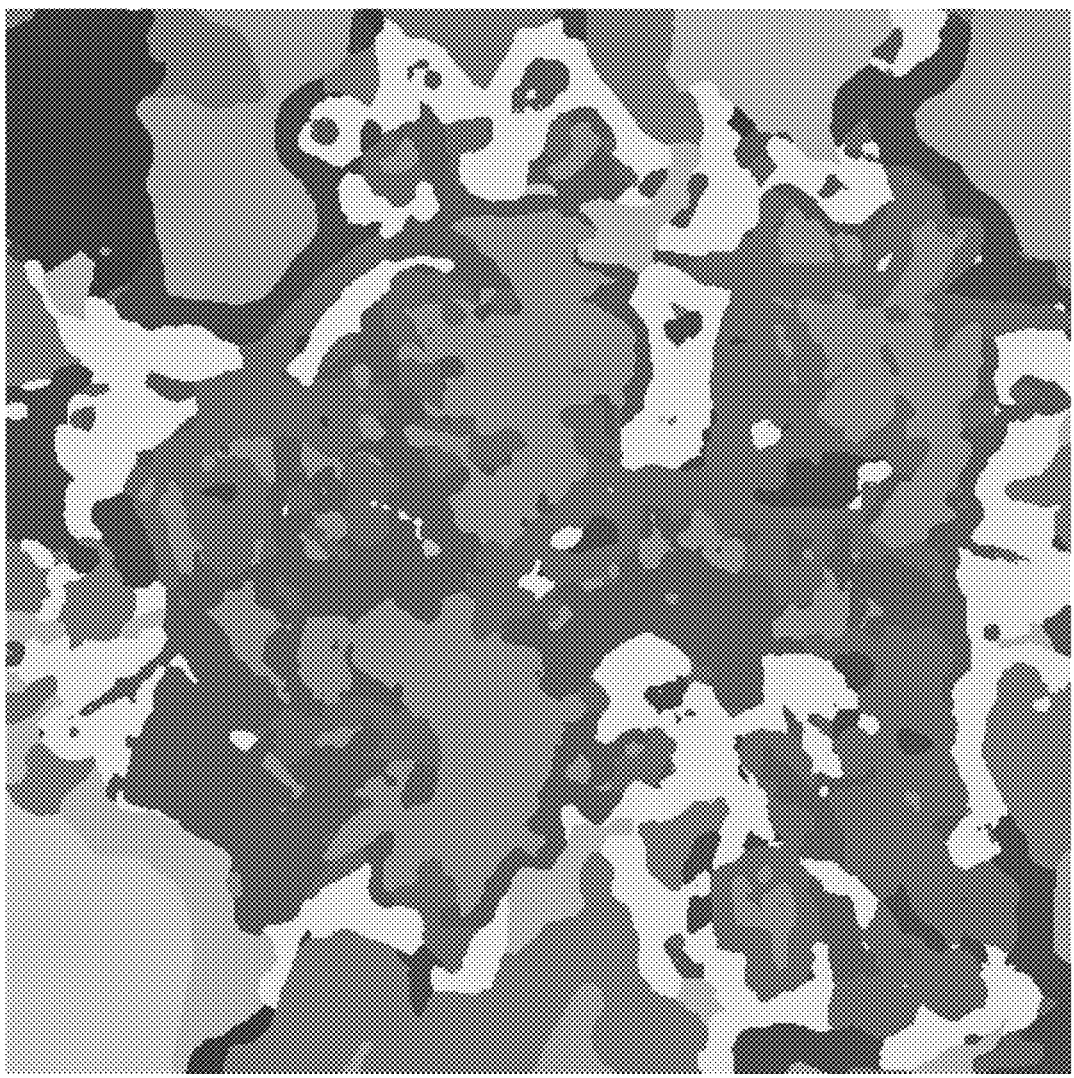
FIG. 5 shows a classification according to the invention over ten classes for the satellite image illustrated in FIG. 1.

FIG. 5 illustrates such a finally classified image, based upon the original image shown in FIG. 1, and in which different classes are represented with different shades of grey. The classification shown in FIG. 5 is thus based upon the smallest Euclidian distances for each pixel in the original image to each one of the classes resulting from the first classification and illustrated in FIG. 3.

Such method, in which a first classification is followed by a calculation of the smallest distance to one or several classes, and then a second classification based upon these calculated smallest distances, solves the above described problems.

Since the smallest distance to a certain class is used for the second classification, the probability that nearby pixels are associated to the same final class will be relatively large. In a similar manner, the probability will be small that one pixel, being similar to a group of pixels which in the final classification falls in a certain class but which is isolated in terms of distance from these other pixels in the image, falls in the same class. In other words, a method according to the present invention will have a strong tendency to group nearby pixels into the same class, and can therefore create connected areas of pixels associated to one and the same class. These effects lead to low scattering in the finally classified image.

On the other hand, the calculated smallest distances to a certain class will change rapidly between nearby pixels in case the composition of classes in the first classification is rapidly changed locally in an area of the image. This results in that a method according to the present invention in a relatively precise way will produce a final classification in which borders between final classes really represent relevant borders and transitions in the original image.

It is noted that the result from the first classification is not necessarily useful in itself. Some of the classes will possibly achieve a grouping of pixels in a way which reflects the real composition of the original image. On the other hand, in most cases at least one class will more often than not group pixels in a noisy way which is difficult to interpret, as described above. This circumstance does however not affect the final result after the second classification, even in the case that this second classification uses all of the classes from the first classification in the same way.

In summary, the above described method can be used to automatically and with no extensive prior knowledge about the contents of a certain image achieve a relevant classification with low scattering.

According to a preferred embodiment, in step 103 the smallest distance is calculated, for each pixel, to each one of all classes used during the first classification, and all classes during the first classification are in this case also used in the second classification. This maximizes the use of the information contained in the original image.

According to a preferred embodiment, the first classification comprises a classification using a K-means cluster analysis followed by a classification using a maximum likelihood cluster analysis, in which the result from the K-means classification is used as a starting point. According to a further preferred embodiment, the second classification comprises a K-means cluster analysis. The present inventors have discovered that such a method yields good end results.

Moreover, the present inventors have obtained good results in case the number of classes in the first classification are either set beforehand to between 20 and 100, or when the first classification uses a variable number of classes, and where the classification in this case is adjusted so that the resulting number of classes is between 20 and 100. According to an especially preferred embodiment, the so-called Akaike information criterion is used in order to decide an optimal number of classes in the first classification, by balancing the complexity of the model to the variance within each class. In other words, the number of classes is selected so that an Akaike information criterion is maximized for the classification for this choice of number of classes. See Akaike H., "A new look at the statistical model identification", IEEE Trans. Automat. Contr. AC-19:716-23, 1974 [Institute of Statistical Mathematics, Minato-ku, Tokyo, Japan].

Correspondingly, it has been found that a suitable number of classes in the second classification is between 5 and 20, especially when the number of classes in the first classification is between 20 and 100. Depending on the detailed application, such a number of classes namely yields a finally classified image with relevant classification of individual pixels and with limited noise in most classes. The choice of number of classes in the second classification depends on the one hand on the type of result desired from the method according to the present invention, on the other hand on if additional processing of the achieved classification is to be performed in later steps. It is especially preferred to used the Akaike criterion to decide the number of classes also in the second classification, in a way corresponding to the one described above.

According to one preferred embodiment, each calculated smallest distance between a pixel and a certain class is weighted before being stored in the second database. By such weighting, the difference in calculated smallest distance to a certain class can be given a larger impact in the second classification. In connection herewith, it is preferred to perform the weighting so that shorter calculated smallest distances affects the second classification relatively more as compared to longer calculated smallest distances. For example, this may be achieved by transforming all calculated smallest distances using a convex function. One example of such transformation is $$d_i^j = \sqrt{x_i^j},$$

wherein $x_i^j$ is the calculated smallest distance between pixel and the closest pixel associated with class j, and $d_i^j$ is the value for the smallest distance between pixel i and class j which is actually stored into the second database.

Such weighting increases the relevance for the final classification of the pixels.

In case the smallest distance is to be calculated between a certain pixel and a certain class, and where the class to which the pixel has been associated in the first database is the same as the class for which the smallest distance is to be calculated, in other words when i=j in the formula above, there are two alternatives regarding what is to be regarded as the smallest distance between the pixel and the class. Either the smallest distance can be set to 0, which reflects that the distance between the pixel in question to itself is 0, alternatively the distance can be set to the smallest distance between the pixel and the closest other pixel which is associated with the same class as the pixel. Both these alternatives can be useful for different applications, but in general it is preferred to set the smallest distance to 0 in case i=j.

As discussed above, a method according to the present invention can advantageously be used to automatically achieve a relevant classification of two-dimensional images, especially for photographical images. Classification of such photographical images containing image information in one channel, such as greyscale light intensity, has been found to yield high quality results. A method according to the present invention is also very useful in the case with photographical images with image information in three or more channels, such as for example colour intensity information according to some conventional colour system using three channels, such as RGB or NCS, or a representation where several different channels represent colour intensity over different wavelength intervals. The latter type of colour information models are for example used in satellite imaging, and in that case often using four or more channels for different wavelengths.

Starting out from such a two-dimensional photographic satellite image, a method according to the present invention can thus be used, for instance as an automatic tool for mapping, demographical or geographical investigations, environmental analyses, etc. In the case with other types of two-dimensional photographical images, a method according to the present invention can be used as a part of a system for example for computer vision, visual inspection of manufactured details, of intermediate goods or raw materials, help systems for photography in order to automatically be able to identify different objects and/or to find suitable focus points, digital image processing, remote reading, microscopy, digital image analysis and processing and so on.

It is further realised that a method according to the present invention is useful for automatically classifying three-dimensional images, especially, and as discussed above, when it comes to three-dimensional images representing the tissue structure in humans and animals within the medicinal and veterinary fields. Such three-dimensional images are often in practice three-dimensional depictions of three-dimensional objects, where each pixel comprises image information concerning the value for one or several material properties at the position in the object which corresponds to the pixel in question. The material properties can for example be material density and/or the presence of a marker substance. It is common that such images only has its image information in one channel. Automatically segmented three-dimensional depictions can especially advantageously be used to analyse the human body, as a support for surgeons during surgery and to analyse three-dimensional depictions within the micro- and nanotechnological fields.

In order to improve the usefulness of the first classification, prior to said first classification the computer or computers applies, according to a preferred embodiment, a kernel-based operation to the original image, and the result from this is then used as the basis for the first classification together with the image information of the original image. One example of this is that a value for each pixel may be calculated for the texture over a limited area around the pixel in question, for example a 9×9 matrix with the pixel in question in the centre, and that this calculated value may then be incorporated into the existing image information for the pixel in question, as an additional information channel, before the first classification is performed. This way, certain information from surrounding pixels will affect what class a certain pixel is associated to in the first database, which in some applications can increase the precision of the final classification.

According to one preferred embodiment, additional information which is known beforehand is added to the colour intensity information as an additional channel or additional channels to each pixel before the first classification. Examples of such additional information in case the image to be classified is a satellite image include local measurement values for geographical data, such as inclination, precipitation, elevation and distribution of solid ground, as well as demographical data such as population density and land ownership. This additional information is thereafter used in the first classification in a way corresponding to the one described above for texture data.

According to another preferred embodiment, additional data is collected, but this additional data is not used in the first classification in the same way as the colour intensity data. Instead, the additional data is used as an initial condition for the classification. One example of this is that a certain value, such as the geographical extension of a population centre, is used in an initial step to distinguish those pixels fulfilling a certain condition, such as "does the pixel fall outside of the limits of a population centre?". Thereafter, the second classification can be performed only on the distinguished pixels, and the pixels not distinguished, hence those pixels in the original image not being located within a population centre in the preceding example, can be placed in a separate class in addition to the classes used in the first classification.

What has been said herein about using additional data in connection with a classification is also useful regarding the second classification. These choices will depend upon the actual application and on what data is available to additionally increase the precision of the classification.

Above, preferred embodiments have been described. However, it is apparent to the skilled person that many modifications can be made to the described embodiments without departing from the idea of the invention.

By way of example, the present method can be performed iteratively. In other words, after a first classification, the calculation of the smallest distance to classes and a second classification, an additional calculation may be performed of the smallest Euclidian distance to one or several of the classes resulting from the second classification, and thereafter an additional classification can be performed based upon these calculated smallest distances. The latter calculation of smallest distance and classification can be varied within the scope of what has been described above for such calculation and for the second classification. For some embodiments, such a classification in several, iterative steps can yield even better results.

Thus, the invention shall not be limited to the described embodiments, but may be varied within the scope of the enclosed claims.

The invention claimed is:

1. A method for classifying an image, comprising the steps that a computer or several interconnected computers are caused to:
  a) store, in the form of a pixel set, in which each pixel is associated with image information in at least one channel for light intensity, a first image to be classified onto a digital storage medium;
  b) carry out a first classification of the image, said first classification being based upon the image information of each respective pixel of the pixel set, said first classification creating a first association for each pixel of the pixel set with a certain class of a first set of classes, each of said first associations being stored in a first database;
  c) for each pixel of the image, determining a closest other pixel that has an association with a particular class of the first set of classes, and calculating a distance between said each pixel and the closest other pixel, said steps of determining and calculating performed for at least two classes of the first set of classes, thereby to store in a second database, for each said pixel, a set of distance data associated with each class of the at least two classes of the first set of classes;
  d) carry out a second classification on the data in the second database, said second classification using, for each pixel stored in the second database, the corresponding smallest distance data for each respective class of the first set of classes recorded in the second database as coordinates in a multi-dimensional feature space, thereby to create a second association for each pixel to a certain class in a second set of classes based upon the smallest distance data of the second database; and
  e) store a classified image in the form of a set of pixels onto a digital storage medium, where each pixel comprises data regarding the association of the pixel to the certain class in the second set of classes, and where the classified image has the same dimensions as the first image.

2. The method according to claim 1, wherein, in step c) the smallest distance is calculated between each pixel and other pixels of all classes in the first set of classes.

3. The method according to claim 2, wherein the first classification is caused to comprise a K-means classification followed by a maximum likelihood classification, in which the result from the K-means classification is used as starting point.

4. The method according to claim 1, wherein the second classification is caused to comprise a K-means classification.

5. The method according to claim 1, wherein the number of classes in the first set of classes is caused to be the number maximizing an Akaike information criterion for the classification.

6. The method according to claim 5, wherein the number of classes in the first set of classes is caused to be between 20 and 100.

7. The method according to claim 1, wherein the number of classes in the first set of classes is caused to be between 20 and 100.

8. The method according to claim 1, wherein the number of classes in the second set of classes is caused to be the number maximizing an Akaike information criterion for the classification.

9. The method according to claim 8, wherein the number of classes in the second set of classes is caused to be between 5 and 20.

10. The method according to claim 1, wherein the number of classes in the second set of classes is caused to be between 5 and 20.

11. The method according to claim 1,
  wherein the first image is a two-dimensional photographic image, and
  wherein each pixel comprises image information in at least three channels, each containing light intensity for a certain wavelength spectrum.

12. The method according to claim 11, wherein the first image is a satellite image.

13. The method according to claim 1,
  wherein the first image is a three-dimensional image of a three-dimensional object, and
  wherein each pixel comprises image information in one channel giving the value for a material property in the position in the object which corresponds to the pixel in question.

14. The method according to claim 1, wherein the computer or the interconnected computers are caused to use information which is calculated beforehand or calculated, in addition to colour intensity, for each pixel in the first image in the first and/or the second classification, as one or several additional channels together with the channel or those channels containing colour intensity data.

15. The method according to claim 14, wherein the first image is a satellite image, and in that the additional data comprises at least some of variables given beforehand such as inclination, precipitation, elevation, distribution of solid ground, population density or land ownership, or a calculated value for texture in a local environment to the pixel for which the texture has been calculated.

16. The method according to claim 1, wherein the computer or the interconnected computers are caused to use information which is calculated beforehand or calculated, in addition to colour intensity, for each pixel in the first image in the first and/or the second classification, in order to, before the classification in question is commenced, associate to a certain class the pixels fulfilling a certain initial condition in terms of the additional data, and then to perform the classification in question only for the rest of the pixels.

17. The method according to claim 16,
  wherein the first image is a satellite image, and
  wherein the additional data comprises at least some of variables given beforehand such as inclination, precipitation, elevation, distribution of solid ground, population density or land ownership, or a calculated value for texture in a local environment to the pixel for which the texture has been calculated.

18. The method according to claim 5, wherein the smallest distance is a smallest Euclidian distance in the image.

19. A method for classifying an image, comprising the steps that a computer or several interconnected computers are caused to:
   a) store, in the form of a pixel set, in which each pixel is associated with image information in at least one channel for light intensity, a first image to be classified onto a digital storage medium;
   b) carry out a first classification of the image, said first classification being based upon the image information of each respective pixel of the pixel set, said first classification creating a first association for each pixel of the pixel set with a certain class of a first set of classes, each of said first associations being stored in a first database;
   c) for each pixel of the image, determining a closest other pixel that has an association with a particular class of the first set of classes, and calculating a distance between said each pixel and the closest other pixel, said steps of determining and calculating performed for at least two classes of the first set of classes, thereby to store in a second database, for each said pixel, a set of smallest distance data associated with each class of the at least two classes of the first set of classes;
   d) carry out a second classification on the data in the second database, said second classification using, for each pixel stored in the second database, the corresponding smallest distance data for each respective class of the first set of classes recorded in the second database as coordinates in a multi-dimensional feature space, thereby to create a second association for each pixel to a certain class in a second set of classes based upon the smallest distance data of the second database; and
   e) store a classified image in the form of a set of pixels onto a digital storage medium, where each pixel comprises data regarding the association of the pixel to the certain class in the second set of classes, and where the classified image has the same dimensions as the first image,
   wherein the computer or the interconnected computers in step c) are caused to weight-adjust each calculated smallest distance prior to performing the second classification of step d), said weighting performed so that, in the second classification in step d), shorter calculated smallest distances are given relatively stronger impact as compared to longer calculated smallest distances.

* * * * *